Figure 1:
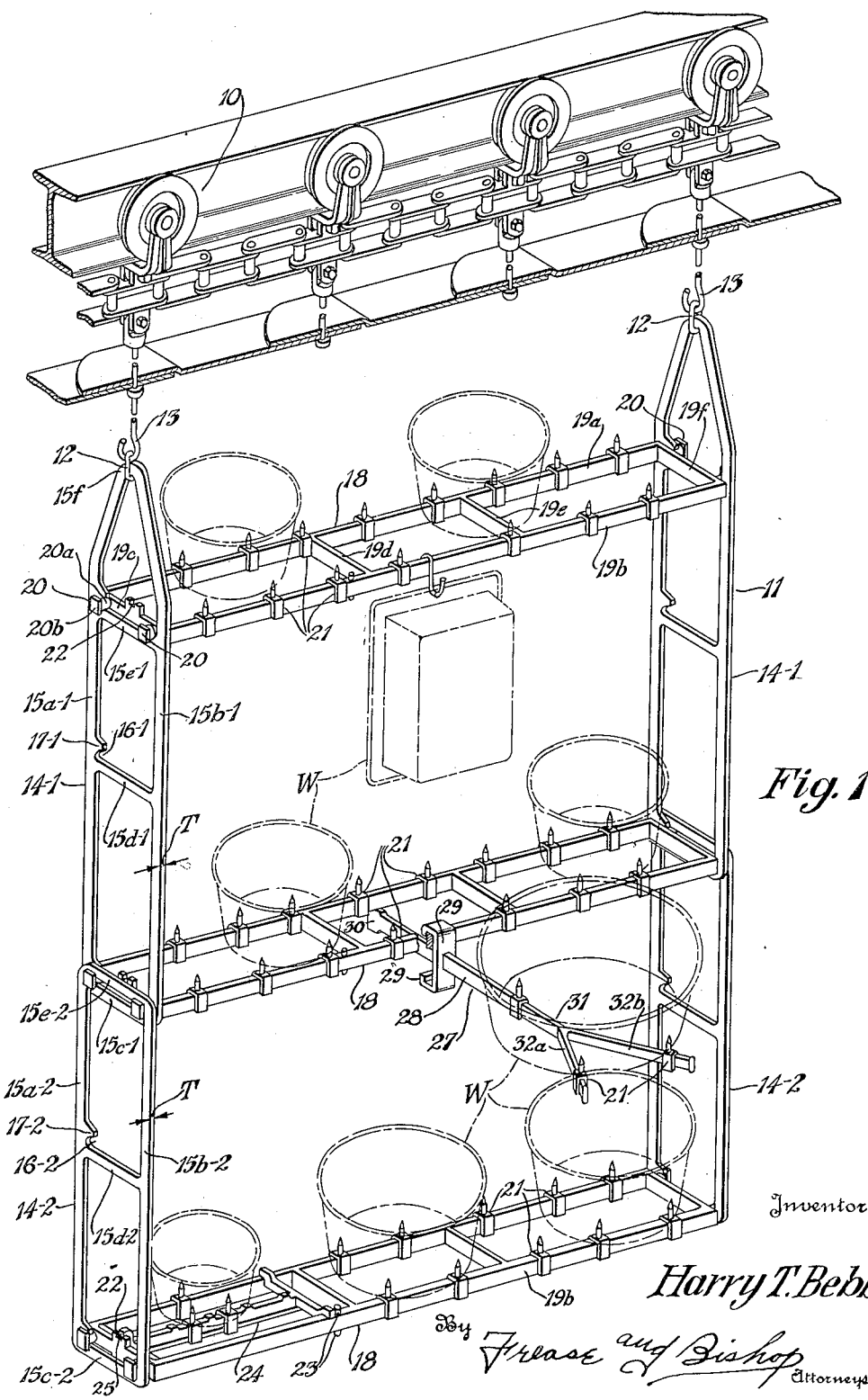

Patented June 20, 1933

1,914,967

UNITED STATES PATENT OFFICE

HARRY T. BEBB, OF CANTON, OHIO, ASSIGNOR TO THE CANTON STAMPING & ENAMELING COMPANY, OF CANTON, OHIO, A CORPORATION OF OHIO

BURNING RACK

Application filed February 27, 1932. Serial No. 595,520.

My invention relates to burning racks for supporting enamelware from a conveyor which transports the racks and enamelware carried thereon into and out of a kiln; and more particularly the conveyor may be a continuous conveyor, and the kiln may be a continuous or tunnel kiln.

In my prior U. S. Letters Patent No. 1,738,030, I disclose a burning rack structure and arrangement, particularly adapted for use in connection with a continuous conveyor traveling through a tunnel kiln, and which will accommodate a maximum number of enamelware pieces, whereby the total number of enamelware pieces burned in the kiln during a unit period of operation may be a maximum.

Burning racks of my aforesaid patent, and of the present improvements, are generally similar, and each includes a plurality of sets of self-connecting rack members, similar rack members being interchangeable one with the other, and the rack members being adapted for self-connection with each other for forming a burning rack having any desired number of tiers of ware supporting rack trays, and the tiered rack structure thus formed being provided with means for stopping swaying thereof.

The objects of the present invention include the provision of an improved structure and arrangement for certain of the self-connecting rack members for a rack of the foregoing general description, whereby the same may be readily cast from heat resisting alloy material.

Further objects of the invention include the provision of a rack of the foregoing general description, and in which novel means are provided for locking certain of the self-connecting rack members from movement with respect to each other in certain directions, and in which novel means are also provided for stopping swaying of the rack.

Further objects of the present invention include the provision of a rack structure including novel ware supporting pins which may be adjustably mounted on the tray or trays of the rack.

The foregoing and other objects are attained by the structure, parts, improvements, combinations, and sub-combinations which comprise the present invention, and the nature of which are set forth in the following general statement, and preferred embodiments of which, together with their mode of use, are set forth in the following description, and which are particularly and distinctly pointed out and set forth in the appended claims forming part hereof.

The nature of the invention comprising the present improved burning rack and parts may be stated in general terms as including a conveyor, one or more sets of longitudinally spaced intermediate or suspending rack members carried by the conveyor, and one or more rack members or trays extending longitudinally between and being supported by each set of suspending members, means being provided on the members for interlocking engagement with each other, and each successively lower set of suspending members being suspended from an upper tray, and being engaged with the upper tray and with the suspending members supporting the upper tray, whereby swaying of the rack is stopped.

Similar rack members are interchangeable with each other, and both the suspending members and the longitudinally extending members or trays are preferably in the form of frames, each frame including spaced side bars and spaced cross bars extending between and connecting the side bars.

A set of laterally spaced headed supporting and connecting lugs extend outwardly from each end cross bar of each tray, and each set of supporting lugs is arranged to rest upon the top surface of one of the cross bars of one of the suspending frames.

One side bar of each suspending frame has formed in its inner face inwardly opening interlocking notches, each merging with one end of the upper face of one of the cross bars.

For forming each notch, a locking tongue preferably extends from the inner face of one of the side bars of each suspending member, each locking lug being spaced above the adjacent cross bar and forming therewith the engaging and interlocking notch, whereby each tray may be interlocked with a set of the suspending frames by inserting the preferably alined lugs at one side of the tray in the preferably alined notches of opposite suspending frames, and by rotating the tray downwardly on the lugs in the notches until the other alined lugs come to rest on the upper faces of their supporting cross bars, and preferably against the inner faces of the suspending frame side bars opposite the notched side bars.

In each suspending frame of each uppermost set, the side bars converge towards each other above the upper cross bar, and the upper ends of the converging side bars are connected by a downwardly opening yoke portion, whereby the uppermost suspending frames may be connected with and be suspended from hooks or the like depending downwardly from a continuous conveyor.

The suspending frames of the other sets are preferably rectangular, and the shanks of the supporting lugs are of sufficient length so that the supporting lugs of a lowermost tray may extend beyond the outer faces of the suspending frames supporting the same, whereby each suspending frame of the next lowermost set, may be carried and interlocked by resting the lower face of its upper end cross bar upon the upper faces of a set of the lugs.

The length of the shanks of the lugs is also preferably of just sufficient length to permit the thus overlapped lower and upper ends of the connected suspending frames to fit easily between the opposed outer face of the adjacent end cross bar of the interlocked tray and the inner faces of the heads of the lugs extending therefrom, thereby stopping swaying of the plural tiered rack which may thus be built up by thus interlocking the several rack members.

Novel adjustable ware supporting members are preferably provided, and each includes a downwardly opening yoke, and from the normally upper face of the base portion of each yoke, a ware supporting pin extends normally upwardly, and the leg portions of each yoke are laterally spaced and arranged to slidably fit about the side faces of any of the side or cross bars of the trays, with the lower face of the base portion of the yoke resting upon the upper face of the supporting bar, whereby the adjustable ware supporting members may be moved to any desired location on the supporting bar for accommodating various sizes of ware.

Burning rack attachments such as those set forth in my U. S. Patent No. 1,738,031, dated November 28, 1928, or improvements thereof, as set forth in greater detail hereinafter, may be utilized in connection with the improved burning rack thus set forth in general terms.

Figure 2:
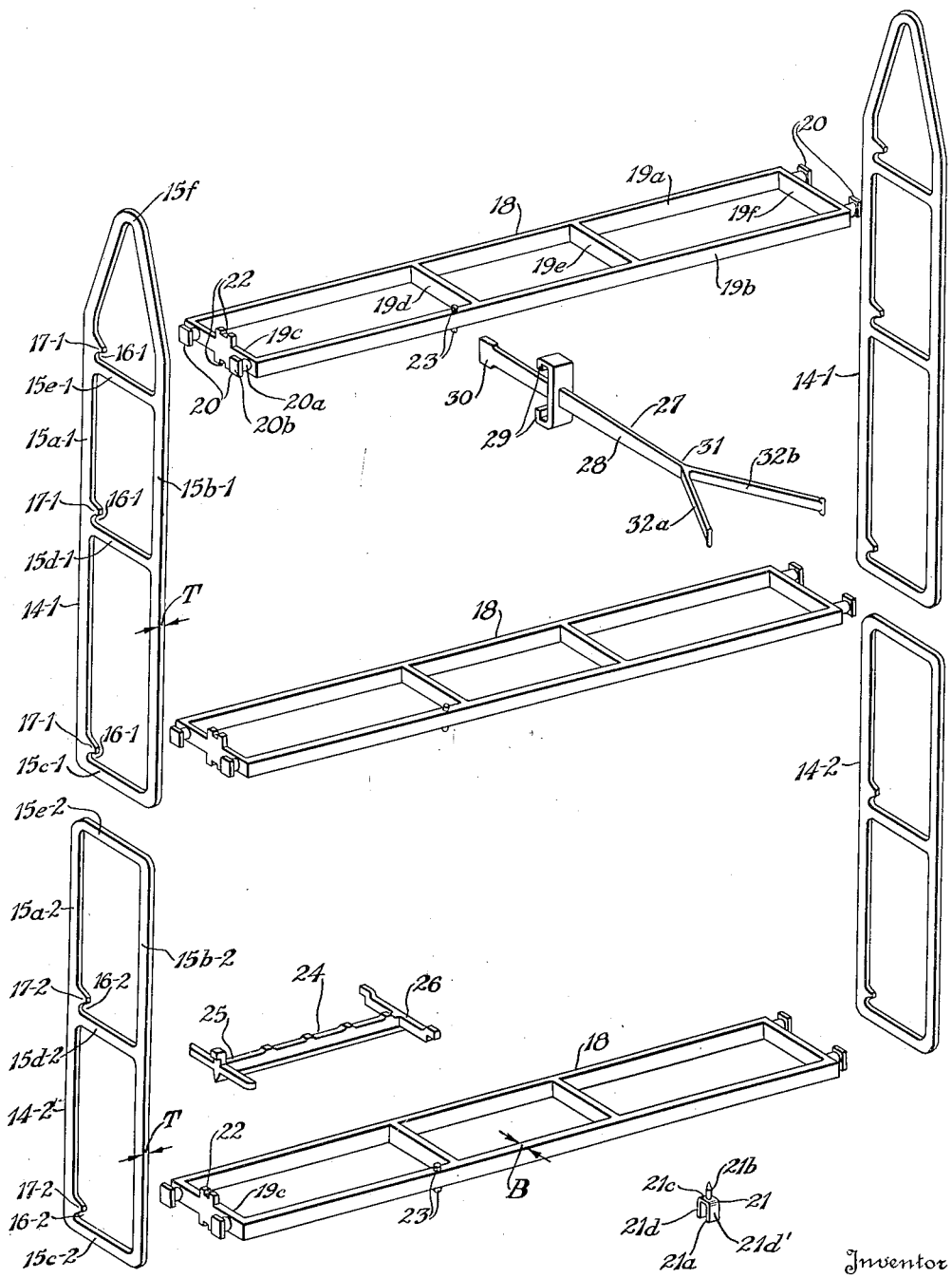

Preferred embodiments of the improved burning rack and parts thereof, are illustrated in the accompanying drawings forming part hereof, in which Figure 1 is a fragmentary perspective view illustrating a plural tiered burning rack apparatus including the present improvements; and Fig. 2, disassembled perspective views illustrating certain of the improved burning rack parts or members.

Similar numerals refer to similar parts throughout the several views.

The improved apparatus as illustrated in Fig. 1, includes a conveyor indicated generally at 10, and the conveyor 10 may be a continuous conveyor which continuously passes into and out of a continuous or tunnel kiln.

A burning rack indicated generally by 11, and including the present improvements, is hung from the conveyor 10, as by means of links 12 which are in supporting connection with upper portions of the rack 11, as will hereinafter be set forth in greater detail, and which links 12 are themselves each supported by suspension from one of a plurality of hooks 13 which depend from and are carried by the conveyor 10.

The burning rack 11 includes an upper set of longitudinally spaced suspending rack members 14—1, which are preferably in the form of frames as illustrated, and each frame 14—1 includes laterally spaced side bars 15a—1 and 15b—1, and a plurality of cross bars 15c—1, 15d—1, and 15e—1, which are spaced from each other longitudinally with respect to the frame, and which extend laterally between and are connected at their ends with the side bars 15a—1 and 15b—1.

In use the cross bar 15e—1 of each frame 14—1 is uppermost, and the side bars 15a—1 and 15b—1 extend beyond the cross bar 15c—1, converge towards each other, and are connected at their ends by a yoke portion 15f which opens towards the cross bar 15e—1, or in other words opens downwardly in use, and the link 12 for each suspending frame 14—1 is linked about the yoke 15f.

The inner face of the side bar 15a—1 of each frame 14—1, has formed therein a plurality of inwardly opening interlocking notches 16—1, each merging with one end of the upper face of one of the cross bars. Each notch is preferably formed by means of a locking tongue 17—1 which extends from the inner face of the side bar 15a—1 towards the side bar 15b—1, and each locking tongue 17—1 is spaced above the adjacent cross bar, whereby each notch 16—1 is formed by the opposite faces of its tongue 17—1 and the adjacent cross bar and the inner face of the side bar 15a—1 located therebetween.

The frames 14—1 are hung from the conveyor 10, so that the side bars 15a—1 are each located at the same side of the hooks 13, whereby the cross bars and the notches of the opposite members 14—1 are alined with each other.

Each set of alined cross bars and notches is adapted for interlocking supporting engagement with the end of a rack member or tray 18 extending longitudinally between the set of frames 14—1.

As illustated in Fig. 1, one of the longitudinally extending trays 18 is supported in interlocking engagement with the uppermost set of alined cross bars 15e—1 and notches 16—1, and another of the logitudinally extending trays 18 is supported in interlocking engagement with the lowermost set of aligned cross bars 15c—1 and notches 16—1.

Each of the longitudinally extending trays 18 is preferably in the form of a frame including laterally spaced side bars 19a and 19b, and a plurality of cross bars 19c, 19d, 19e, and 19f, which are spaced from each other longitudinally with respect to the tray 18, and which extend laterally between and are connected at their ends with the side bars 19a and 19b.

Headed supporting and connecting means extend outwardly from each end cross bar of each tray 18, and as illustrated, the supporting and connecting means comprise a pair of laterally spaced headed lugs 20 each of which extends outwardly from the outer face of one of the end cross bars 19c and 19f.

Each lug 20 includes a shank 20a which is connected at its inner end with its supporting cross bar, and which has formed on its outer end an enlarged head 20b.

For attaining interlocking and the stopping of rack swaying, the length of each shank 20a between the opposite faces of its head 20b and its supporting cross bar is slightly greater than twice the thickness T of the side bars of the depending frames.

The burning rack 11 furthermore includes a lower set of suspending rack members 14—2, which are preferably in the form of rectangular frames as illustrated, and each frame 14—2 includes laterally spaced side bars 15a—2 and 15b—2, and a plurality of cross bars 15c—2, 15d—2, and 15e—2, which are spaced from each other longitudinally with respect to the frame, and which extend laterally between and are connected at their ends with the side bars 15a—2 and 15b—2.

The inner face of the side bar 15a—2 of each frame 14—2 has formed therein a plurality of inwardly opening interlocking notches 16—2.

As illustrated a notch 16—2 is provided which merges with one end of the normally upper face of the cross bar 15c—2, and another notch 16—2 is provided which merges with the similar end of the normally upper face of the cross bar 15d—2.

The notches 16—2 are each preferably formed by means of a locking tongue 17—2 which extends from the inner face of the side bar 15a—2 towards the side bar 15b—2, and each locking tongue 17—2 is spaced above the adjacent cross bar, whereby each notch 16—2 is formed by the opposite faces of its tongue 17—2 and its adjacent cross bar and the inner face of the side member 15a—2 located therebetween.

The lowermost longitudinally extending tray 18 supported on the lowermost cross bars 15e—1 of the uppermost set of suspending frames 14—1, is interengaged as illustrated in Fig. 1, so that the shanks 20a and the heads 20b of the lugs 20 extending beyond the outer faces of the suspending frames 14—1, and one of the lower depending rack members 14—2 is supported and interengaged on the outer portions of each end pair of lugs 20 on the lowermost tray 18 carried by the upper frames 14—1.

The supporting and interengaging of each frame 14—2, each on an end pair of lugs 20 as aforesaid, is effected by resting the lower face of the upper cross bar 15e—2 of each frame 14—2 on the upper and outer portions of the shanks 20a of its supporting lugs, with the sides of the cross bar 15e—2 fitting between the opposite faces of the lug heads 20b and the supporting frame 14—1.

By these means the whole rack assembly is locked against swaying longitudinally, and the aforesaid interengaging of the lugs 20 of the longitudinally extending trays with the suspending frames, stops any but very slight relative movements between the rack members in any other directions, when the rack is in use.

On the other hand the rack is very easily assembled and disassembled.

Novel adjustable ware supporting members 21 are preferably used in connection with the rack 11, and each ware supporting member 21 includes a downwardly opening yoke 21a and a ware supporting pin 21b which extends normally upwardly from the base portion 21c of the yoke, and the leg portions 21d and 21d' of the yoke are laterally spaced from each other a distance slightly greater than the breadth B of the bars of the trays 18, whereby each yoke 21a thus has a U opening and may slidably fit about the side faces of the bars of any of the trays 18. with the lower face of the base portion of each yoke resting upon the upper face of the supporting bar, whereby the adjustable ware supporting members 21 may be adjustably located at any desired positions on the supporting bars for accommodating various sizes of ware.

In Fig. 1, different sizes of ware W are illustrated in dot-dash lines, and the several sizes of ware W are supported in various manners on the rack 11.

Each of the longitudinally extending trays 18 is preferably provided with an outwardly opening notch 22 formed on each of the normally upper or lower faces of its end cross bar 19c.

A stop member which may be a pin 23 also preferably extends outwardly from each of the normally upper or lower faces of the side bar 19b of each tray 18, each pin being located on its tray 18 between the end cross bar 19c and the cross bar 19d.

A notch 22 is thus formed on each of the normally upper or lower faces of the end cross bar 19c of each tray 18, and a pin 23 extends outwardly likewise from each of the normally upper or lower faces of the side bar 19b of each tray 18, because each tray 18 is preferably adapted to be used reversibly, as well as interchangeably, in making the racks 11.

A removable bridge indicated generally by 24 may be supported on each tray 18, by engagement with the uppermost notch 22 and engagement between the end cross bar 19c and the uppermost pin 23.

As illustrated, each bridge 24 is T shaped with the extremity of the stem portion 25 of the T adapted to be engageable in and supported by the uppermost notch 22, and with the extremities of the cross portion 26 adapted to bridge across and be supported upon the uppermost faces of the side bars 19a and 19b of each tray 18, and one extremity of the cross portion 26 of the T bridge being adapted to abut against the uppermost pin 23.

One of the T bridge members is illustrated in use in Fig. 1, for enabling the supporting of ware which is too small to bridge across and be supported on the side bars 19a and 19b of the trays 18.

As illustrated, the adjustable and removable ware supporting members 21 are also adapted to slidably fit about the side faces of the stem portion 25 of each T bridge 24.

For further increasing the carrying capacity of each rack 11, improved cantilever attachments, each indicated generally by 27 may be provided.

Each cantilever attachment 27 includes a stem 28, and intermediate the ends of the stem 28, a hook 29 is preferably provided at each of a pair of opposite sides of the stem 28 for enabling reverse use of the attachment.

One of the hooks 29 of each attachment 27 is adapted to hook over one of the side bars of any of the trays 18. One end 30 of each stem 28 is arranged to abut upwardly against the under face of the tray side bar opposite the side bar which is supporting the hook 29.

The other end 31 of each stem 28 diverges in Y arms 32a and 32b, whereby ware supporting members 21 may be located on the stem portion 25, and on each of the Y arms 32a and 32b for supporting ware thereon.

Accordingly, by a suitable selection and use of the foregoing interchangeable and self-connecting rack members, a tiered rack having any number of tiers of trays 18 may be suspended by any opposite pair of the hooks 13 which depend from and are carried by the conveyor 10.

The enamelware W rests in the usual manner on the pins 21b of the ware supporting members 21, or may be, when desired, hung by hooks from the trays 18.

I claim:

1. Apparatus for enamelware manufacture and the like, including a conveyor, one or more members carried by the conveyor, one or more longitudinally extending rack members carried by the conveyor carried members, and one or more members carried by the longitudinally extending members.

2. Apparatus for enamelware manufacture and the like, including a conveyor, one or more members carried by the conveyor, one or more longitudinally extending rack members carried by the conveyor carried members, one or more members carried by the longitudinally extending members, and means for interlocking the members with each other.

3. Apparatus for enamelware manufacture and the like, including a conveyor, one or more members carried by the conveyor, one or more longitudinally extending rack members carried by the conveyor carried members, one or more members carried by the longitudinally extending members, and interfitting headed lug and bar means for interlocking the members with each other.

4. A burning rack including a bar, and a ware supporting member adjustably mounted on the bar, the ware supporting member including a normally downwardly opening yoke fitting on the bar and a ware supporting pin extending normally upwardly from the yoke.

5. A burning rack including a tray comprising a plurality of connected bars, and ware supporting members adjustably mounted on the bars, each ware supporting member including a normally downwardly opening yoke fitting on one of the bars and a ware supporting bar extending normally upwardly of the yoke.

6. A ware supporting member for use in enamelware manufacture and the like in connection with a burning rack including a bar, the ware supporting member including a yoke member having a U opening adapted for adjustably fitting on the bar, and a ware supporting pin extending from the yoke member.

7. Apparatus for enamelware manufacture and the like, including a conveyor, one or more frames carried by the conveyor, one or more longitudinally extending rack members carried by the frames, each of the frames including laterally spaced side bars and a plurality of cross bars, and each rack member including at each end thereof a plurality of laterally spaced lugs supported on the cross bar of an adjacent frame.

8. Apparatus for enamelware manufacture and the like, including a conveyor, one or more frames carried by the conveyor, one or more longitudinally extending rack members carried by the frames, each of the frames including laterally spaced side bars and a plurality of cross bars, and each rack member including at each end thereof a plurality of laterally spaced lugs supported on the cross bar of an adjacent frame and extending and fitting between the side bars thereof.

9. Apparatus for enamelware manufacture and the like, including a conveyor, one or more frames carried by the conveyor, one or more longitudinally extending rack members carried by the frames, each of the frames including laterally spaced side bars and a plurality of cross bars, and each rack member including at each end thereof a plurality of laterally spaced lugs supported on the cross bar of an adjacent frame and extending and fitting between the side bars thereof, and each frame having one or more tongues extending from one of its side bars above an adjacent cross bar, each tongue being adapted for preventing movement away from the adjacent cross bar of one of the rack member lugs supported thereon.

10. Apparatus for enamelware manufacture and the like, including a conveyor, one or more frames carried by the conveyor, one or more longitudinally extending rack members carried by the frames, each of the frames including laterally spaced side bars and a plurality of cross bars, and each rack member including at each end thereof a plurality of laterally spaced lugs supported on the cross bar of an adjacent frame, and one or more frames each having an upper cross bar supported on the laterally spaced lugs at one end of one of the rack members.

11. Apparatus for enamelware manufacture and the like, including a conveyor, one or more frames carried by the conveyor, one or more longitudinally extending rack members carried by the frames, each of the frames including laterally spaced side bars and a plurality of cross bars, and each rack member including at each end thereof a plurality of laterally spaced lugs having shanks extending from the rack member and heads on the shanks spaced from the rack member and the lug shanks being supported on the cross bar of an adjacent frame, and one or more frames each having an upper cross bar supported on the shanks of the laterally spaced lugs at one end of one of the rack members.

In testimony that I claim the above, I have hereunto subscribed my name.

HARRY T. BEBB.